Jan. 30, 1951  H. N. WHEELER  2,539,938
DUAL TIRE VALVE
Filed Oct. 21, 1946
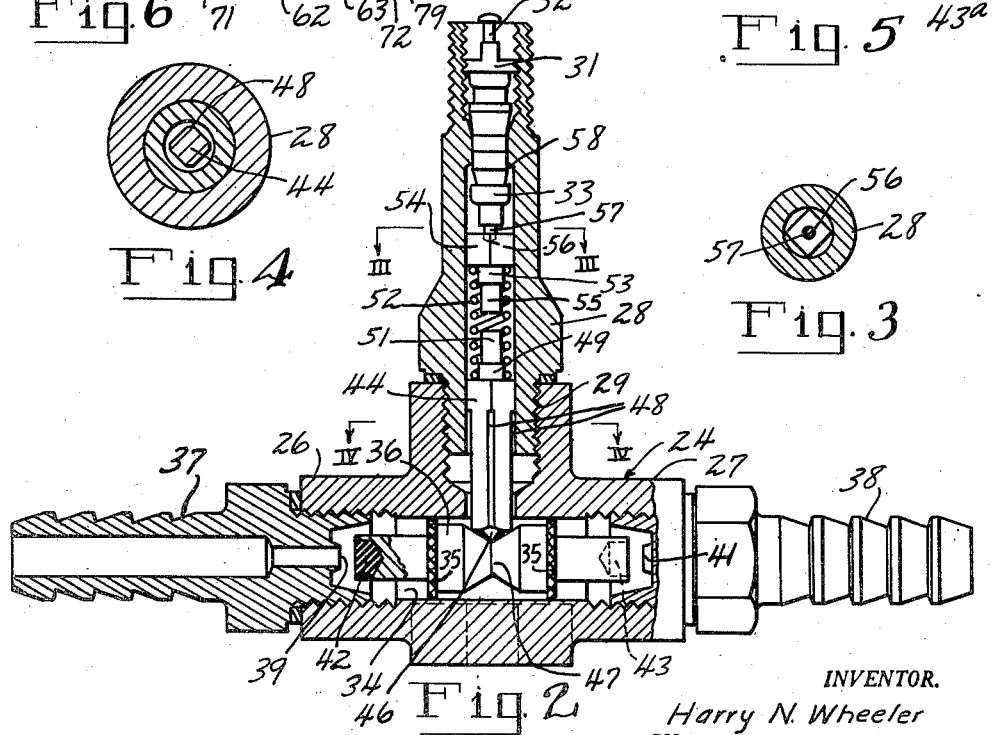
INVENTOR.
Harry N. Wheeler
BY
Henry L. Jennings
Attorney Patented Jan. 30, 1951

2,539,938

UNITED STATES PATENT OFFICE 2,539,938

DUAL TIRE VALVE

Harry N. Wheeler, Birmingham, Ala., assignor to Wheeler Dual Valve Company, Birmingham, Ala., a copartnership Application October 21, 1946, Serial No. 704,749

4 Claims. (Cl. 277—7)

My present invention relates to an improvement in dual tire valves, and is a continuation in part of my previously filed application Serial No. 628,097, filed November 13, 1945, and now abandoned.

One object of my invention is to provide a dual tire pressure equalizing device which shall include improved means whereby in the inflation of the tires equal volumes of air are introduced into both tires simultaneously, thereby insuring equal inflation pressures.

A further object of my invention is to provide a device of the character described which automatically shuts off air from a suddenly deflated tire, as for instance when a blow out occurs and which is so constructed that in normal operation the pressure in both tires is always equal.

A further object is to provide a dual tire pressure equalizing device embodying a floating piston having valves on opposite ends thereof and a centrally disposed groove, in combination with a spring biased plunger having one end fitting in the groove and movable inwardly, thus to effect a positive unseating of both valves leading to the tires when gauging or inflating the same.

A further object is to provide a dual tire valve in which the valves are biased toward the open or normal position at all times by an inwardly biased pin having a single spring associated therewith, whereby when the tires are being inflated or gauged the valves are forced to open position.

A still further object is to provide a device of the character described in which only one spring is associated with the two valves, thereby eliminating the necessity of providing accurately calibrated springs to maintain the desired balance in the valves.

A still further object is to provide a device of the character described in which the pin and spring therefor remain assembled in the valve body upon removal of the inflation valve associated therewith.

Apparatus embodying features of my invention is illustrated in the accompanying drawing, forming a part of this application, in which Fig. 1 is a sectional view of a pair of dual wheels having my improved device mounted thereon;

Fig. 2 is a longitudinal cross sectional view through my improved valve drawn to an enlarged scale;

Fig. 3 is a detail sectional view taken along line III—III of Fig. 2;

Fig. 4 is a detail sectional view taken along line IV—IV of Fig. 2;

Fig. 5 is a partly sectional view showing a slightly modified form of piston for use in my improved dual tire valve; and Fig. 6 is a fragmentary sectional view showing a somewhat modified form of my invention.

Referring to the drawing for a better understanding of my invention, I show a pair of wheels 10 and 11 which are mounted on the usual hub 13 and carry pneumatic tires 14 and 15. The tires are provided with standard inflation valve stems 16 and 17, which are so well known in the art that no further description of the same is necessary. In order to minimize the wear and tear due to centrifugal force, I preferably mount my improved valve, indicated generally by the numeral 18, on the hub 13, though it may be mounted on any suitable portion of the wheels. Flexible hose 19 and 21 connect the device with the valve stems 16 and 17 and are provided with the usual chucks 22 and 23. The chucks 22 and 23 are each provided with a centrally disposed pin which is adapted to hold its associated tire inflation valve off its seat when the chucks are screwed thereon, in the manner well understood in the art.

My improved pressure equalizing device 18 embodies a T-shaped body 24, having aligned legs 26 and 27 which are preferably formed integrally, though they may be formed separately if desired. The third leg 28 of the T is preferably threaded into the body 24 as indicated at 29. The leg 28 has threaded into the outer end thereof the usual tire inflation valve 31, having the through pin 32 by means of which the lower portion 33 is moved inwardly for inflating or gauging the tire, in the manner well understood.

The aligned legs 26 and 27 of the body 24 are provided with a cylindrical bore 34 within which fits a valve carrying piston 36. The piston 36 is slidable within the opening 34 and fits therein with a close but not an air tight fit. The enlarged heads of the piston are coarsely knurled as indicated at 35, for a purpose later to be described. Threaded within the ends of the aligned legs of the body are hose connector members 37 and 38. Adjacent the inner ends of the members 37 and 38 are valve seats 39 and 41, against which valves 42 and 43, carried by the piston 36, are adapted to fit with an air tight connection. The valves 42 and 43 are preferably formed or rubber vulcanized to the piston as shown.

The piston 36 is held normally on center, and the valves 42 and 43 are held open, by means of a pin 44 having a conical shaped lower end 46 fitting within an annular groove 47 in the piston 36. The pin 44 is preferably formed of square stock and its edges are cut away as indicated at 48 thereby to permit a more free flow of air through the leg 28. At its opposite end, the pin 44 is provided with a reduced portion 49 and a further reduced and projecting portion 51. A small spring 52 fits about the portion 49 and the other end thereof is similarly fitted about the reduced portion 53 of an actuating member 54. The member 54 likewise is formed of square stock and is provided at its lower end with a projecting portion 55. Its upper end is provided with a recess 56 adapted to receive the projecting inwardly movable end 57 of the inflation valve 31.

It will be noted that the central bore in the leg 28 of the valve is reduced as indicated at 58, and that it is necessary to unscrew the leg 28 from the valve body in order to remove the members 54 and 44, and spring 52. It will be apparent, therefore, that with the tires fully inflated, the valve 31 may be removed without danger of the pressure blowing the parts just mentioned out of the leg 28.

From the foregoing, the operation of my improved dual tire valve will be readily understood. During normal operation, with both tires inflated, the spring 52, acting through the pin 44 and member 54, holds both valves 43 and 42 off their respective seats 39 and 41. Any slight increase or decrease of air pressure within either tire is equalized in the other since air may pass freely from one tire to the other in a gradual flow through the tubes 19 and 21, into the chamber 34 and around the piston 36, without disturbing the position of the piston and consequently the valves 42 and 43. If, however, one tire becomes suddenly deflated, the high pressure remaining in the other tire acts against the piston 36 pushing it and the valves 42 and 43 toward the low pressure side, thus closing the valve on the low pressure side and effectively preventing leakage from the inflated tire to the deflated one.

When it is desired to gauge the pressure in the tires, the gauge is applied to the leg 28 of the dual tire valve, thus depressing the pin 32 and bringing together the projecting portions 55 and 51 of the member 54 and the plunger 44, respectively. These projections are of such length that they come together prior to the limit of inward movement of the inflation valve stem 32, thereby assuring that the conical end 46 of the plunger 44 rests in the bottom of the groove 47, thus holding both valves open during gauging. With the gauge thus applied, it will be apparent that air from both tires flows into the chamber 34 thence upwardly through the third leg of the valve and to the gauge. If the tires are being inflated, both valves 42 and 43 will be opened in the manner just described when an air hose chuck is applied to the inflation valve contained in the leg 28. Because of the fact that the force from the single spring 46 is transmitted to the valves through the pin and V-shaped groove on the member 36, the spring 52 may vary considerably in strength. Therefore, with my improved construction there is no need for having an accurately calibrated spring in order to maintain equal pressures in the tires and to gain an accurate testing of the same.

If it is assumed that one tire is completely deflated and its associated valve 42 or 43 is closed, the application of a gauge to the stem 28 indicates a pressure which is less than the actual pressure remaining in the still inflated tire. This is due to the fact that during the test both valves 42 and 43 are opened in the manner already described, so that one side of the bore 34 is in communication with the deflated tire. Thus, if a tire suddenly becomes deflated without the vehicle operator's knowledge, which in actual practice often happens, this fact will be indicated by applying the gauge. If the pressure has fallen below normal due to a gradual leak in either or both tires, the gauge indicates the actual equalized pressure remaining in each tire.

Referring now to Fig. 5, I show a somewhat modified form of piston 36a in which the rubber material 42a and 43a forming the valves is held in place by curling the end 59 of the piston. Also, the enlarged portions of the pistons may be slightly knurled as indicated at 61, to permit a more free flow of air past the piston.

In Fig. 6 I show a modified form of my valve. The same comprises a centrally grooved piston 62, positioned in the central bore 63 of the T-shaped body 64. In each end of the bore is threaded a valve casing 66 and 67, the inner ends 68 and 69 of which form valve seats. The piston 62 is provided with a pair of stems 71 and 72 which project into passages 73 and 74 provided in the valve casings 66 and 67. Fixedly mounted on the stems are valves 76 and 77, the portions 78 and 79 of which are preferably formed of rubber or the like and are adapted to cooperate with the seats 68 and 69, respectively. The stems are thus journalled in the passages 73 and 74 and form guides for the whole movable valve assembly. In other respects, this modification is the same as and functions similarly to the valve shown in Figs. 1 to 4.

From the foregoing, it will be apparent that I have devised an improved pressure equalizing device for use in conjunction with dual tires which is simple and sturdy of construction and reliabe in operation.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. In a device of the character described, a T-shaped body having connecting air passages throughout each leg thereof, an inflation valve in one leg through which air is supplied to the valve body, valve casings in each end of coaxial legs of the body, fixed valve seats in both of said casings, a single movable valve carrying member within said coaxial legs, there being a V-shaped groove in said member, a valve on each end of said member adapted to cooperate with said seats, a pin projecting from the leg of the T-shaped body containing the inflation valve and having one end fitting in said V-shaped groove, and a spring interposed between said inflation valve and said pin to hold the pin in the groove in all positions of the valve member thereby to bias both of said valves on said member toward open position.

2. In a pressure equalizing device, a T-shaped valve body having air passages through each leg thereof, fixed valve seats in coaxial legs of the body, a valve carrying piston positioned for movement between said valve seats, a valve on each of the opposed ends of said piston cooperating with said seats, there being a V-shaped groove in the central portion of said piston, a pin having one end resting in said groove, a spring having one end bearing against the other end of said pin, an actuating member in contact with the opposite end of said spring, an inflation valve with its inner movable portion bearing against said actuating member, and projections on the actuating member and said pin adapted to contact each other upon inward movement of the inflation valve thereby to positively hold the pin in the bottom of said groove.

3. In a device for equalizing the pressure in a pair of dual tires, a T-shaped body having air passages through each leg thereof, fixed valve seats threaded into the ends of the coaxial legs of the body, an inflation stem threaded into the third leg of the body, there being an air passage in the inflation stem reduced in diameter near the outer end of the stem, an inflation valve in the outer end of the inflation stem and embodying an inwardly movable end, a piston slidably mounted in the coaxial legs and having an annular groove therein, a pin having a rounded end fitting in said groove, a valve on each end of the piston cooperating with said seats an actuating member fitting against the inwardly movable end of the inflation valve, a spring interposed between the actuating member and said pin and adapted to bias the pin toward the piston, and a projection on the actuating member adapted upon inward movement of the inflation valve to engage the pin and positively hold the rounded end thereof in the bottom of said V-shaped groove.

4. In a device for equalizing the pressure in a pair of dual tires, a T-shaped body having air passages through each leg thereof, fixed valve seats threaded into coaxial legs of the body, an inflation stem threaded into the third leg of the body, there being a cylindrical air passage through the inflation stem larger in diameter at the inner end than at the outer end, an inflation valve threaded into the outer end of the stem and embodying an inwardly projecting movable portion, a valve carrying piston slidably mounted in the coaxial legs and having a centrally disposed V-shaped groove therein, a valve on each end of the piston cooperating with said seats, a pin formed of square stock slidable in the inner end of said stem and having one end fitting in said V-shaped groove, an actuating member formed of square stock and slidable in the stem, a spring positioned between the actuating member and said pin and adapted to press the former into contact with the movable portion of the inflation valve and the latter into contact with the piston, and projections on adjacent ends of the actuating member and pins adapted upon inward movement of the inflation valve to positively hold the lower end of said pin in the bottom of the V-shaped groove.

HARRY N. WHEELER.

REFERENCES CITED

The following references are of record in the file of this patent:

UNITED STATES PATENTS

| Number | Name | Date |
|---|---|---|
| 1,147,542 | Pike | July 20, 1915 |
| 1,609,641 | Christensen | Dec. 7, 1926 |
| 1,931,637 | Wahl | Oct. 24, 1933 |
| 1,967,383 | Turgot | July 24, 1934 |
| 2,232,601 | Gille | Feb. 18, 1941 |
| 2,386,585 | Blank | Oct. 9, 1945 |
| 2,445,547 | Wheeler | July 20, 1949 |

FOREIGN PATENTS

| Number | Country | Date |
|---|---|---|
| 211,710 | Switzerland | Jan. 2, 1941 |